US 7,474,076 B2

(12) United States Patent
Kim

(10) Patent No.: US 7,474,076 B2
(45) Date of Patent: Jan. 6, 2009

(54) SECONDARY BATTERY WITH POSITIVE TEMPERATURE COEFFICIENT (PTC) SAFETY ELEMENT

(75) Inventor: Jun-Ho Kim, Asansi (KR)

(73) Assignee: Samsung SDI Co., Ltd., Suwon-si (KR)

( * ) Notice: Subject to any disclaimer, the term of this patent is extended or adjusted under 35 U.S.C. 154(b) by 400 days.

(21) Appl. No.: 10/869,837

(22) Filed: Jun. 18, 2004

(65) Prior Publication Data
US 2004/0257036 A1 Dec. 23, 2004

(30) Foreign Application Priority Data
Jun. 19, 2003 (KR) .................... 10-2003-0039957

(51) Int. Cl.
*H02J 7/00* (2006.01)
(52) U.S. Cl. ...................... 320/112; 320/107
(58) Field of Classification Search ................ 320/150, 320/107, 112, 154; 429/163, 176–179
See application file for complete search history.

(56) References Cited

U.S. PATENT DOCUMENTS 5,976,729 A  11/1999  Morishita et al.

FOREIGN PATENT DOCUMENTS

| JP | 10-340714 | 12/1998 | |
|---|---|---|---|
| JP | 2000-311667 | * | 7/2000 |
| JP | 2000-311667 | | 11/2000 |
| JP | 2001-043837 | | 2/2001 |
| JP | 2002-324542 | * | 8/2002 |

OTHER PUBLICATIONS

Office Action issued in Chinese Patent Application No. 200410083273.3 dated Jan. 27, 2006.

* cited by examiner

*Primary Examiner*—Akm E Ullah
*Assistant Examiner*—Richard V Muralidar
(74) *Attorney, Agent, or Firm*—Stein, McEwen & Bui, LLP

(57) ABSTRACT

A secondary battery includes an electrode assembly having a separating plate interposed between an anode plate and a cathode plate. A container receives the electrode assembly together with an electrolyte. The container is electrically connected to one of the anode plate and the cathode plate. Also, the secondary battery includes a cap assembly having an electrode terminal electrically connected to one of an end of the anode plate and the cathode plate. The cap assembly is fixed to an opening of the container to seal the same. Also included is a safety device having a PTC (positive temperature coefficient) element contacting the container without an element interposed therebetween.

18 Claims, 4 Drawing Sheets

SECONDARY BATTERY WITH POSITIVE TEMPERATURE COEFFICIENT (PTC) SAFETY ELEMENT

CROSS-REFERENCE TO RELATED APPLICATION

This application claims the benefit of Korean Patent Application No. 2003-39957, filed Jun. 19, 2003, in the Korean Intellectual Property Office, the disclosure of which is incorporated herein by reference.

BACKGROUND OF THE INVENTION

1. Field of the Invention

The present invention relates to a secondary battery, and more particularly, to an attachment structure of a PTC (positive temperature coefficient) element in a secondary battery.

2. Description of the Related Art

Unlike the primary battery, the secondary battery may be recharged. Common types of secondary batteries include the nickel-hydrogen battery, the lithium battery, and the lithium-ion battery. The secondary battery may be made into a battery pack and used as the power source for various portable electronic devices such as cellular phones, laptop computers, and camcorders.

Depending on the external shape, secondary batteries may be classified into different types, for example, square, cylindrical, and pouch batteries. With respect to the square secondary battery, this type of battery includes an electrode assembly in which an anode plate and a cathode plate are stacked with a separating plate interposed therebetween. The electrode plate and electrolyte are placed in a metal can that is substantially in the form of a regular hexahedron, and a cap assembly seals an opening of an upper end of the can.

The can may be made of aluminum or an aluminum alloy, which are lighter than and do not corrode as easily as other metals such as iron. The can itself may function as an electrode terminal. For example, an electrode terminal that is insulated from the can in the cap assembly functions as a cathode terminal, and the can functions as an anode terminal.

Furthermore, in secondary batteries as described above, safety devices such as a PTC element, a thermal fuse, and a PCM (protecting circuit module) may be mounted to an exterior of the can before mounting the can in a battery pack. These safety devices are mounted to the anode terminal and the cathode terminal to perform cutoff of current when battery voltage abruptly rises due to an increase in battery temperature or excessive charging/discharging, thereby preventing the battery from exploding.

The above safety devices are connected to the anode terminal and cathode terminal of the battery using a lead plate. The lead plate is made of nickel or a nickel alloy, or stainless steel plated with nickel to thereby have a predetermined hardness and conductivity.

However, many problems result when welding the lead plate made of nickel (or a variation thereof described above) to a bottom surface of the can, which is made of aluminum. Because of the insolubility of nickel and conductivity of aluminum, it is necessary to use laser welding due to difficulties encountered when using ultrasonic welding or resistance welding for connection of these two elements. Laser welding, however, has its own problems. In particular, the heat generated by the laser beam used in laser welding is transmitted to the safety devices compromising the reliability of the devices.

In an effort to overcome these difficulties, U.S. Pat. No. 5,976,729 discloses a secondary battery in which a first lead plate made of nickel is connected, prior to battery assembly, to a bottom surface of an aluminum can. Also, a second lead plate is connected to the first lead plate using resistance welding. These lead plates are used for connection of safety devices.

FIG. 4 is a front view of a conventional secondary battery having a PTC element. A PTC element 1 is fixed to a plate 5 that is attached to a bottom surface 3a of a can 3. Also, a first lead plate 7 extends from the PTC element 1 to a PCM 9, which is mounted to a side surface of the can 3, to interconnect these elements. A second lead plate 11 extends from the PCM 9 to a cap assembly terminal 13 to interconnect these elements. As a result, the PTC element 1 and the PCM 9 are electrically connected to an anode terminal and a cathode terminal of the battery.

With the configuration of the PTC element 1 connected to the bottom surface 3a of the can 3 with the plate 5 interposed therebetween, the PTC element 1 is distanced from the bottom surface 3a of the can 3 by an amount equal to a thickness t of the plate 5. As a result, when the temperature of the secondary battery rises, the transmission of heat to the PTC element 1 occurs through the plate 5. Therefore, some of the heat is dissipated in the plate 5 and not all of the heat of the battery is transmitted to the PTC element 1.

The end result is that the PTC element 1 is unable to perform precise detection of battery temperature. Therefore, current cutoff is performed more slowly than when needed, thus not ensuring battery safety.

SUMMARY OF THE INVENTION

In one exemplary embodiment of the present invention, there is provided a secondary battery that enables a PTC element to be more sensitive to heat generated in the battery.

In an exemplary embodiment of the present invention, a secondary battery includes an electrode assembly having a separating plate interposed between an anode plate and a cathode plate. A container receives the electrode assembly together with an electrolyte. The container is electrically connected to one of the anode plate and the cathode plate. Also, the secondary battery includes a cap assembly having an electrode terminal that is electrically connected to the other of the anode plate and the cathode plate. The cap assembly is fixed to an opening of the container to seal the same. There is also included a safety device having a PTC (positive temperature coefficient) element that is mounted closely contacting the container without an element interposed therebetween.

According to another aspect of the invention the PTC element closely contacts a lower surface of the container. The safety device includes a lower plate mounted to the lower surface of the container at a predetermined distance from the PTC element, a first lead plate mounted electrically interconnecting the lower plate and the PTC element, and a second lead plate mounted between the PTC element and the electrode terminal of the cap assembly to electrically interconnect these elements.

According to another aspect of the invention, the safety device further includes a PCM (protecting circuit module) mounted to an end of the second lead plate, and a third lead plate electrically interconnecting the PCM and the electrode terminal.

According to another aspect of the invention, the container is made of aluminum or is an aluminum alloy.

According to another aspect of the invention, the container is electrically connected to the anode plate of the electrode assembly, and the electrode terminal is electrically connected to the cathode plate of the electrode assembly.

According to another aspect of the invention, the secondary battery further includes a safety vent formed in the container.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
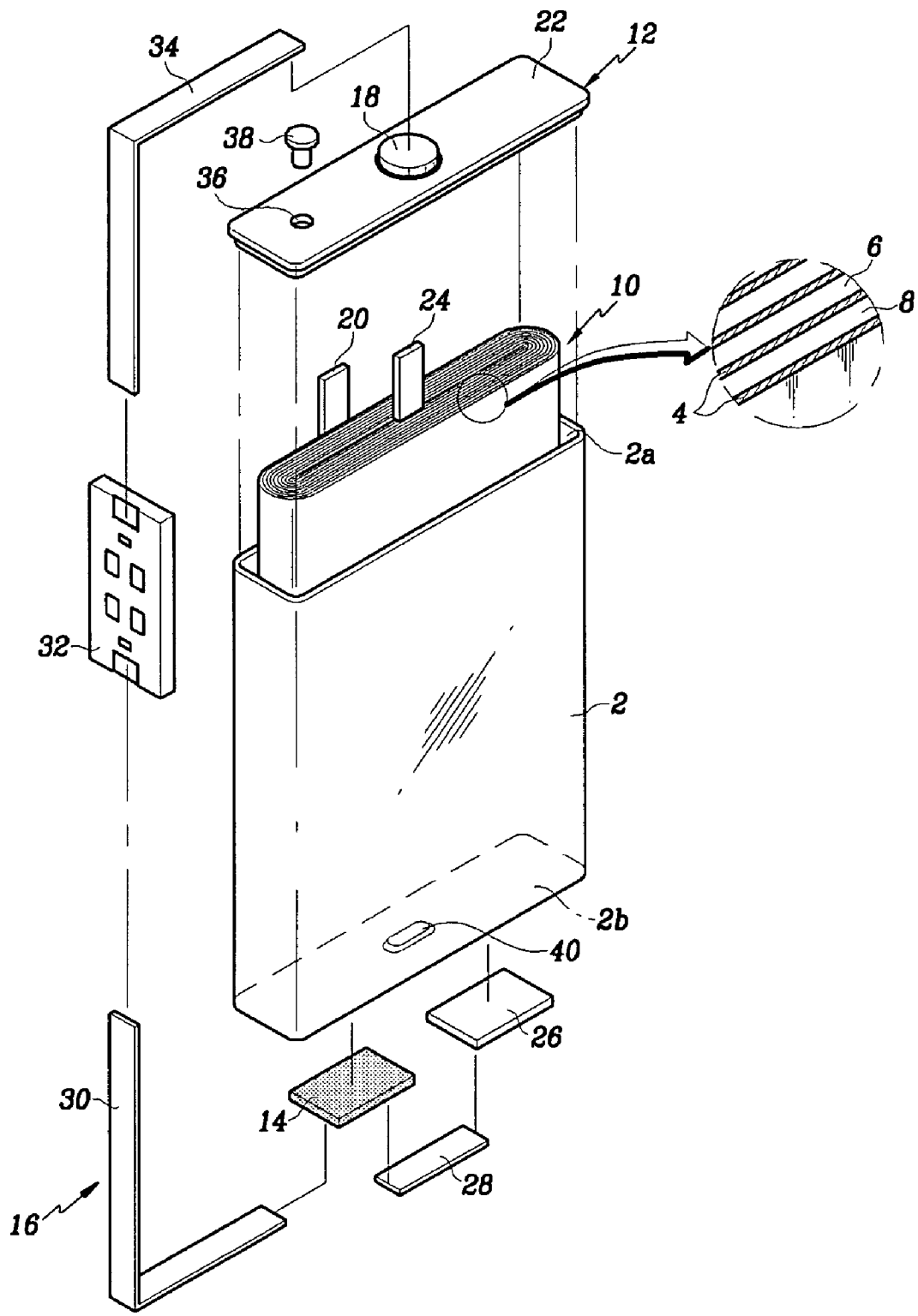
FIG. 1 is an exploded perspective view of a secondary battery according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 2:
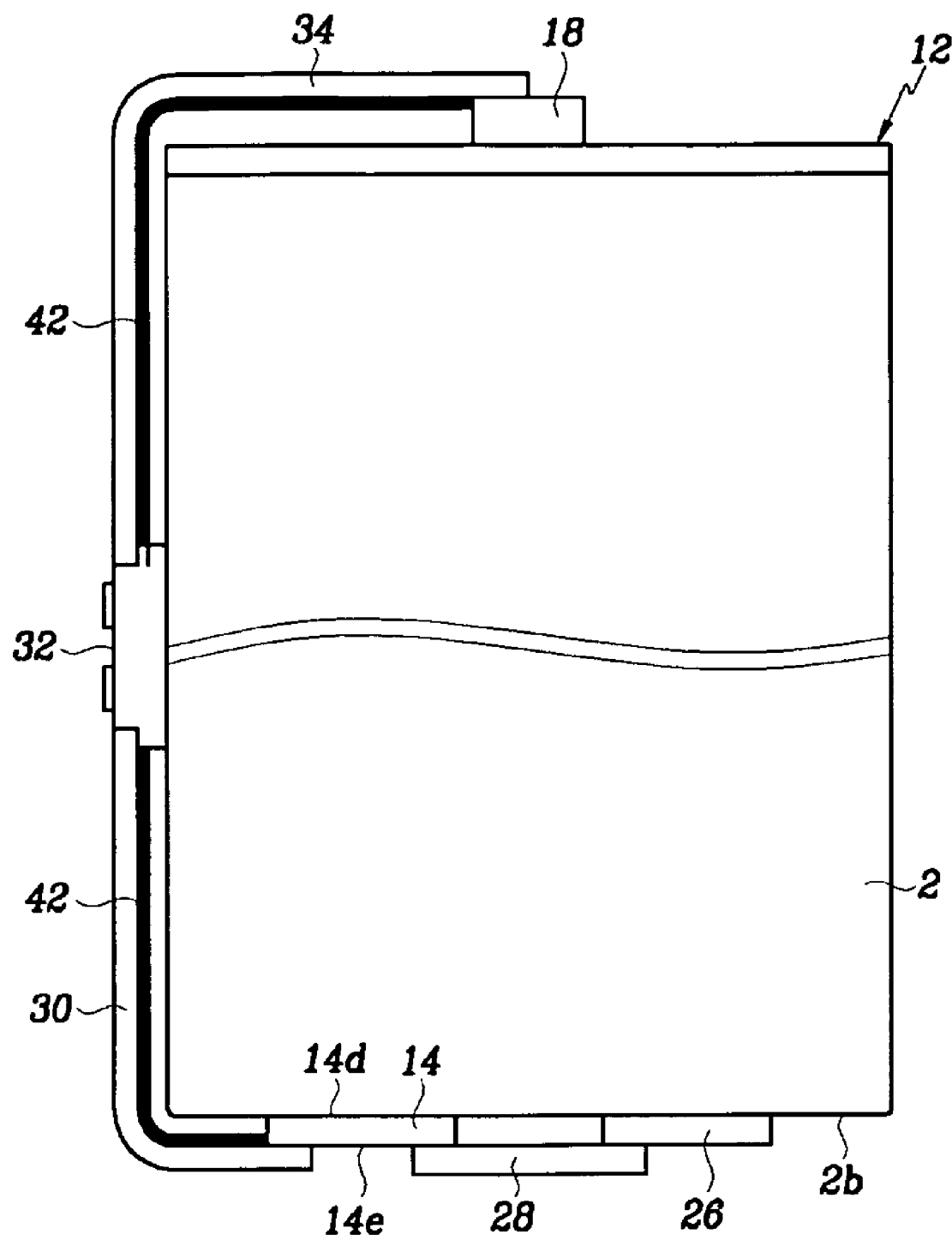
FIG. 2 is a front view of the secondary battery of FIG. 1.

FIG. 1 is an exploded perspective view of a secondary battery according to an exemplary embodiment of the present invention, and FIG. 2 is a front view of the secondary battery of FIG. 1.

The secondary battery includes a container 2 that is substantially in the shape of a regular hexahedron. A separating plate 4 is interposed between stacked layers of an anode plate 6 and a cathode plate 8, and this assembly is wound in a jelly roll configuration forming an electrode assembly 10. The electrode assembly 10 is placed in the container 2 together with a predetermined amount of electrolyte. A cap assembly 12 is mounted to an upper end of the container 2 to thereby close off and seal an opening 2a of the container 2. Further, a PTC element 14 is mounted to an outer surface of the container 2 closely contacting the same. The PTC element 14 is part of a safety device 16 that directly operates in response to heat generated in the container 2.

The container 2 includes the opening 2a formed on one of its sides, and the electrode assembly 10 is inserted through the opening 2a. The container 2 is made of metal to thereby act as a terminal.

In the exemplary embodiment of the present invention, the container 2 is made of aluminum or an aluminum alloy. The container 2 may be electrically connected to the anode plate 6 of the electrode assembly 10 to thereby function as an anode terminal. The container 2 may also function as a cathode terminal when an electrode terminal 18, which is insulated from the container 2 in the cap assembly 12, is electrically connected to the cathode plate 8 of the electrode assembly 10.

To realize the above different configurations to allow functioning of the container 2 as an anode terminal and a cathode terminal, an anode lead 20 of a predetermined length is fixed to the anode plate 6 of the electrode assembly 10, and the anode lead 20 is welded to a lower surface of a cap plate 22 of the cap assembly 12. With the cap plate 22 mounted and sealing the opening 2a of the container 2, the cap plate 22 and the container 2 are electrically connected to the anode plate 6 such that the container functions as an anode terminal.

Further, a cathode lead 24 of a predetermined length is fixed to the cathode plate 8 of the electrode assembly 10. The cathode lead 24 is welded to a lower surface of the electrode terminal 18 such that the electrode terminal 18 is electrically connected to the cathode plate 8. The electrode terminal 18 maintains a state of insulation from the cap plate 22 through an insulating gasket (not shown).

The safety device 16 is mounted between a first surface 2b of the container 2, which is capable of functioning as an anode terminal, and the electrode terminal 18 of the cap assembly 12, which is capable of functioning as a cathode terminal. The safety device 16 performs current cutoff preventing the explosion of the battery. The safety device 16 operates when there is an external short, an internal short caused by a mechanical shock applied to the battery, or when voltage abruptly increases as a result of excessive charging and discharging.

The PTC element 14 is mounted to the first surface 2b of the container 2 in the current flow path to the electrode 18. The PTC element 14 is mounted to the outer surface of the container 2 without any interposing element therebetween to thereby directly receive heat generated in the container and allow immediate operation.

Specifically, the safety device 16 includes a lower plate 26 mounted to the first surface 2b of the container 2, the PTC element 14 also mounted to the first surface 2b of the container 2 at a predetermined distance from the lower plate 26, a first lead plate 28 electrically interconnecting the lower plate 26 and the PTC element 14, and a second lead plate 30 mounted between the PTC element 14 and the electrode terminal 18 of the cap assembly 12 to electrically interconnect these elements.

Further, the safety device 16 includes a PCM 32 mounted to a center area of one of the sides of the container 2. An end of the second lead plate 30 opposite that connected to the PTC element 14 is connected to the PCM 32. Also, a third lead plate 34 extends from the electrode terminal 18 to the PCM 32. Hence, the safety device 16 includes both a PTC element and a PCM.

The PTC element 14 may be mounted at any area on the outer surface of the container 2 (including its first surface 2b). In one embodiment, the PTC element 14 is mounted to the first surface 2b as described above. With the PTC element 14 mounted to the first surface 2b of the container 2, the lower plate 26 need not extend over the entire first surface 2b of the container 2, and may be reduced in size compared to conventional configurations. As described above, the PTC element 14 is mounted on the lower surface 2b of the container 2 at a predetermined distance from the lower plate 26, and directly contacts the container 2 without placing an element therebetween, thereby directly receiving the heat of the container 2.

Therefore, the PTC element 14 is able to operate with greater sensitivity to the heat generated in the container, and is in the direct path of the current flow from the first lead plate 28 to the second lead plate 30.

Figure 3:
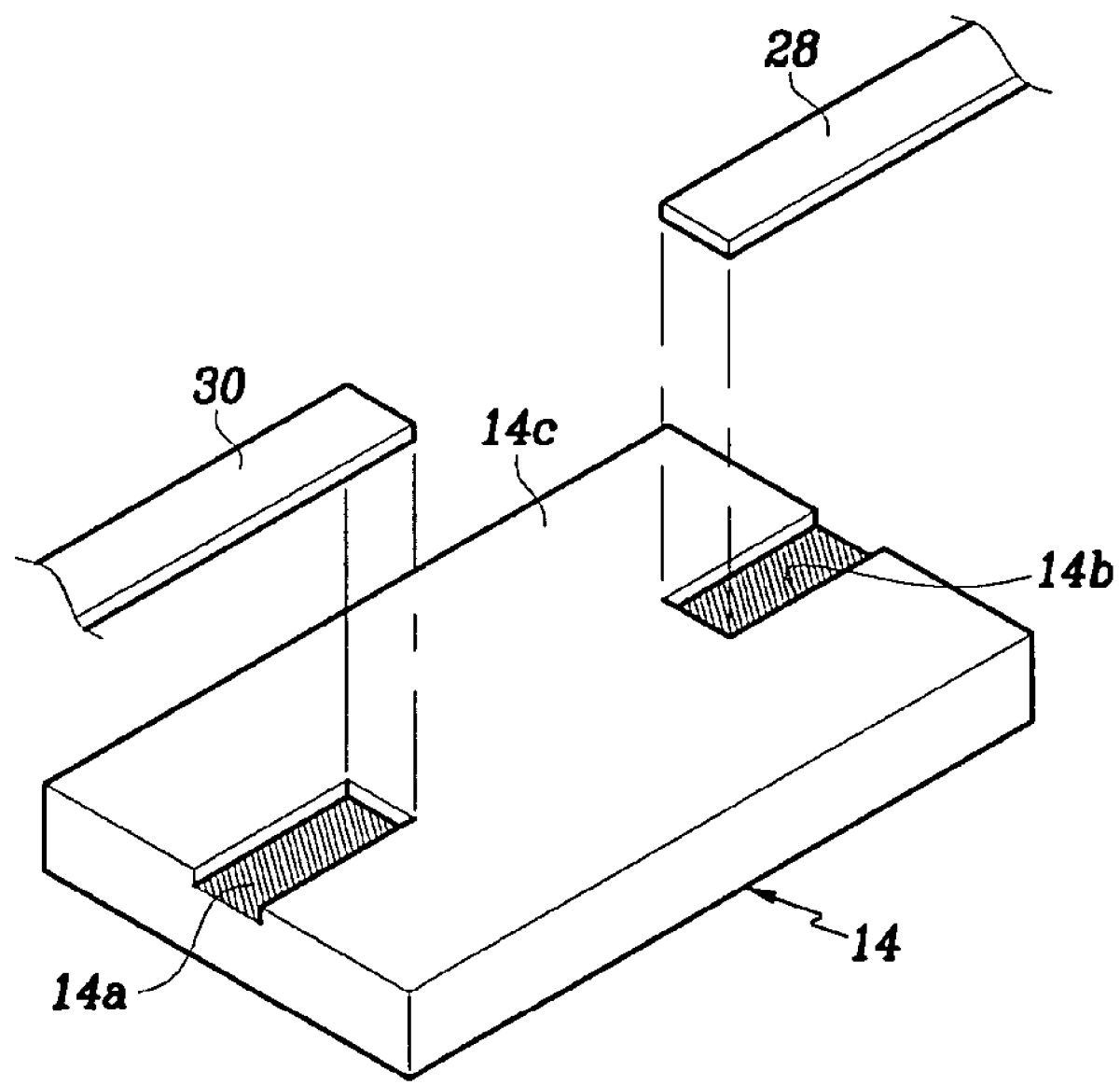
FIG. 3 is an exploded perspective view of a PTC element and first and second lead plates of FIG. 1.
Figure 4:
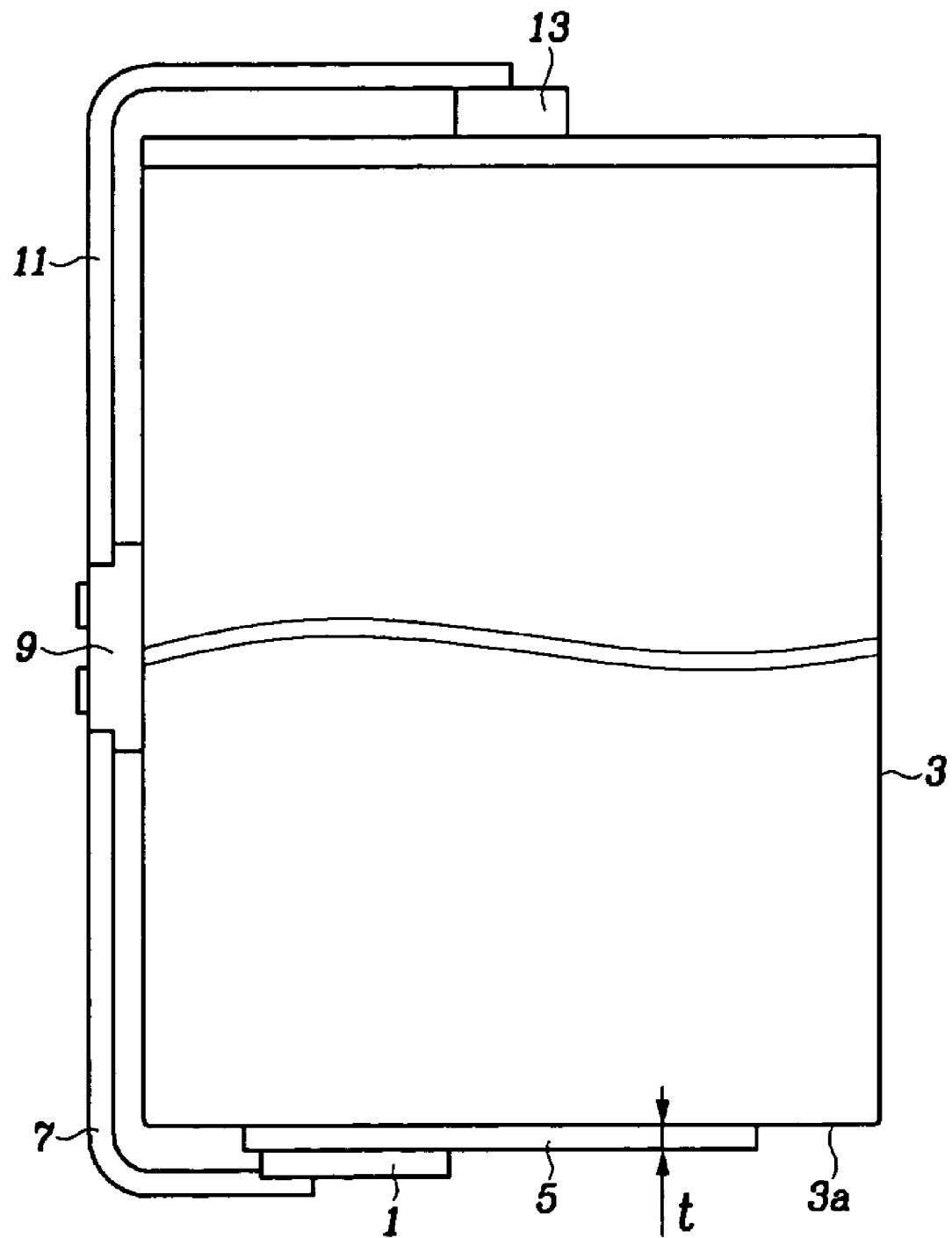
FIG. 4 is a front view of a conventional secondary battery.

FIG. 3 is an exploded perspective view of the PTC element 14 and portions of the first and second lead plates 28 and 30. The PTC element 14 includes a PTC main body 14a made by mixing a polymer and a conductive material so that it exhibits insulating characteristics when overheated by polymer expansion, and an insulation film 14c that covers the PTC main body 14a and includes a pair of aperture regions 14b corresponding to a surface 14e (see FIG. 2) of the PTC element 14 opposite a surface 14d (see FIG. 2) adjacent to the container 2 when mounted thereon. The aperture regions 14b expose predetermined areas of the PTC main body 14a. A first end of the first lead plate 28 is positioned within one of the aperture regions 14b, and a first end of the second lead plate 30 is positioned within the other aperture region 14b such that the first and second lead plates 28 and 30 are electrically connected to the PTC main body 14a.

In the PTC element 14 described above, the outer surface 14d rather than being electrically connected to the lower surface 2b of the container 2 is electrically connected to the battery through the first and second lead plates 28 and 30. Further, since the PTC element 14 directly contacts the container 2, there is no heat loss between the container 2 and the PTC element 14.

Accordingly, with the use of the safety device 16 of the present invention, if there is an external short or an internal short, or excessive charging/discharging resulting in an abrupt increase in the temperature of the container 2, the PTC element 14 is capable of quickly detecting overheating of the container 2 and respond quickly. In this case, the PTC element 14 cuts off current of the safety device 16 and thereby improves battery safety.

Reference numeral 36 in FIG. 1 indicates an electrolyte filling opening, and reference numeral 38 shows a plug for sealing the electrolyte filling opening 36. Further, reference numeral 40 indicates a safety vent having a thickness less than other parts of the container 2. The safety vent 40 ruptures before other areas of the container 2 if there is an increase in the interior pressure of the container 2 due to overcharging of the battery and other such problems. The safety vent 40, therefore, provides additional safety.

Further, reference numeral 42 in FIG. 2 indicates an insulation layer that insulates the second and third lead plates 30 and 32 from the container 2.

With the positioning of the PTC element 14 on the first surface 2b of the container 2 as shown in FIGS. 1 and 2, the size of the lower plate 26 and the length of the first lead plate 28 may be reduced. As a result overall manufacturing costs of the battery are minimized.

In the secondary battery of the present invention described above, the PTC element closely contacts the outer surface of the container of the battery. As a result, heat loss between the container and the PTC element is minimized such that the PTC element may be more sensitive to heat generated in the battery. This enables the PTC element to quickly cutoff current in the event of overheating of the battery, thereby enhancing the overall safety of the battery.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A secondary battery, comprising:
    an electrode assembly including a separating plate interposed between an anode plate and a cathode plate;
    a container receiving the electrode assembly together with an electrolyte, the container being electrically connected to one of the anode plate and the cathode plate;
    a cap assembly including an electrode terminal and a cap plate, the electrode terminal being electrically connected to an end of the anode plate and the cap plate being electrically connected to an end of the cathode plate, the cap assembly being fixed to an opening of the container to seal the container; and
    a safety device including a PTC (positive temperature coefficient) element contacting an outer lower surface of the container opposite to the cap assembly without an element interposed therebetween, the PTC element including a pair of aperture regions located at opposite ends of the PTC element;
    a lower plate mounted to the lower surface of the container and placed at a predetermined distance from the PTC element;
    a first lead plate positioned within one of the aperture regions of the PTC element and electrically interconnecting the lower plate and the PTC element; and
    a second lead plate positioned within the other one of the aperture regions of the PTC element and mounted between the PTC element and the electrode terminal of the cap assembly to electrically interconnect the PTC element and the electrode terminal of the cap assembly.

2. The secondary battery of claim 1, wherein the safety device further comprises:
    a PCM (protecting circuit module) mounted to an end of the second lead plate; and
    a third lead plate electrically interconnecting the PCM and the electrode terminal.

3. The secondary battery of claim 1, wherein the container is made of one of aluminum and an aluminum alloy.

4. The secondary battery of claim 1, wherein the container is electrically connected to the anode plate of the electrode assembly, and the electrode terminal is electrically connected to the cathode plate of the electrode assembly.

5. The secondary battery of claim 1, further comprising a safety vent formed in the container.

6. The secondary battery of claim 1 wherein the container has a hexahedron shape.

7. The secondary battery of claim 1, wherein the safety device cuts off current to the secondary battery, preventing an explosion of the battery.

8. The secondary battery of claim 1, wherein the safety device acts in response to an external short, an internal short or when voltage changes abruptly in response to excessive charging and discharging.

9. The secondary battery of claim 1, wherein the PTC element is made by mixing a polymer and a conductive material.

10. The secondary battery of claim 9, wherein the PTC element further includes an insulation film covering the PTC element.

11. The secondary battery of claim 2, further comprising an insulation layer insulating the second and third lead plates.

12. A secondary battery, comprising:
    an electrode assembly having an anode plate and a cathode plate;
    a container holding the electrode assembly;
    a cap assembly electrically connected to the anode plate and the cathode plate; and
    a safety device including a PTC (positive temperature coefficient) element, the PTC element directly mounted onto a first outer surface of the container opposite to the cap assembly, and including a pair of aperture regions located at opposite ends of the PTC element;
    a lower plate mounted at the first outer surface of the container and placed at a predetermined distance from the PTC element;
    a first lead plate positioned within one of the aperture regions of the PTC element and electrically interconnecting the lower plate and the PTC element; and
    a second lead plate positioned within the other one of the aperture regions of the PTC element and mounted between the PTC element and the cap assembly to electrically connect the PTC element and the cap assembly.

13. The secondary battery of claim 12, wherein the safety device further comprises:
- a PCM (protecting circuit module) mounted to an end of the second lead plate; and
- a third lead plate electrically interconnecting the PCM and the electrode terminal.

14. The secondary battery of claim 13, further comprising an insulation layer insulating the second and third lead plates.

15. The secondary battery of claim 12, wherein a size of the lower plate and a length of the first lead plate are reduced by a positioning of the PTC element on the first surface of the container.

16. The secondary battery of claim 12, wherein the PTC element closely contacts an outer surface of the container of the battery.

17. A method of assembling a secondary battery, the method comprising:
- forming an electrode assembly having an anode plate and a cathode plate;
- placing the electrode assembly in a container together with an electrolyte;
- electrically connecting a cap assembly to the anode plate and the cathode plate
- mounting a PTC (positive temperature coefficient) element directly onto a first surface of the container opposite to the cap assembly, and having a pair of aperture regions located at opposite ends of the PTC element;
- mounting a lower plate to the first surface of the container at a predetermined distance from the PTC element;
- forming an insulation layer along the first, a second and a third surfaces of the container;
- mounting a first lead plate within one of the aperture regions of the PTC element and between the lower plate and the PTC element electrically interconnecting the lower plate and the PTC element; and
- mounting a second lead plate within the other one of the aperture regions of the PTC element and between the PTC element and the cap assembly to electrically interconnect the PTC element and the cap assembly.

18. The method of claim 17, further comprising:
- mounting a PCM (protecting circuit module) to an end of the second lead plate; and
- mounting a third lead plate between the PCM and the electrode terminal electrically interconnecting the PCM and the electrode terminal.

* * * * *